May 22, 1951  C. A. NICHOLS  2,554,378
MOLD ASSEMBLY
Filed Nov. 29, 1947  9 Sheets-Sheet 1

INVENTOR.
Charles A. Nichols
by
Spencer Hardman & Fehr
his attorneys

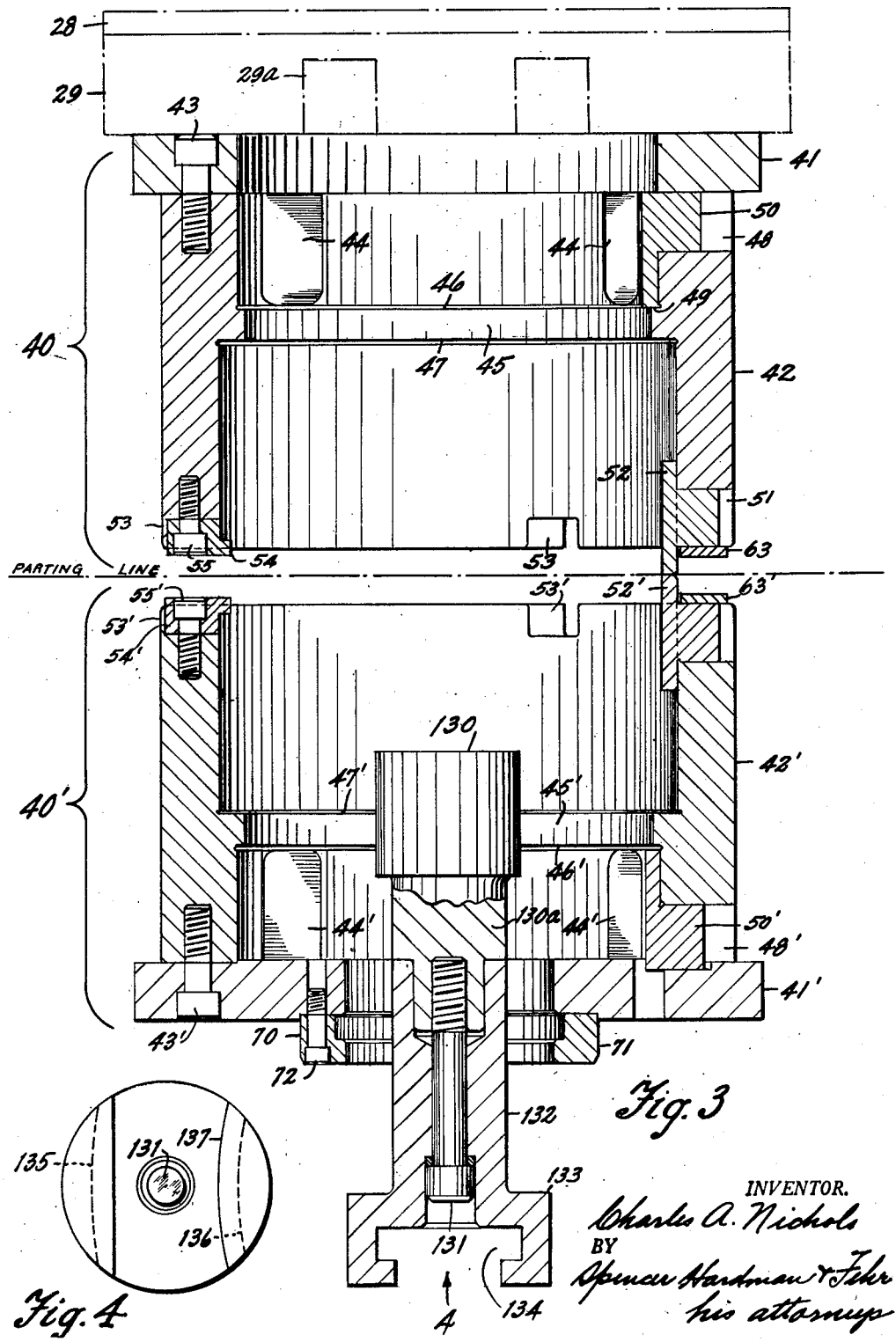

May 22, 1951  C. A. NICHOLS  2,554,378
MOLD ASSEMBLY
Filed Nov. 29, 1947  9 Sheets-Sheet 3

INVENTOR.
Charles A. Nichols
BY Spencer Hardman & Fehr
his attorneys

May 22, 1951  C. A. NICHOLS  2,554,378
MOLD ASSEMBLY

Filed Nov. 29, 1947 9 Sheets-Sheet 4

INVENTOR.
Charles A. Nichols
BY
Spencer Hardman & Fisher
his attorney

May 22, 1951  C. A. NICHOLS  2,554,378
MOLD ASSEMBLY

Filed Nov. 29, 1947  9 Sheets-Sheet 5

Charles A. Nichols
INVENTOR.
by Spencer Hardman and Fehr
his attorneys

May 22, 1951 C. A. NICHOLS 2,554,378
MOLD ASSEMBLY
Filed Nov. 29, 1947 9 Sheets-Sheet 6
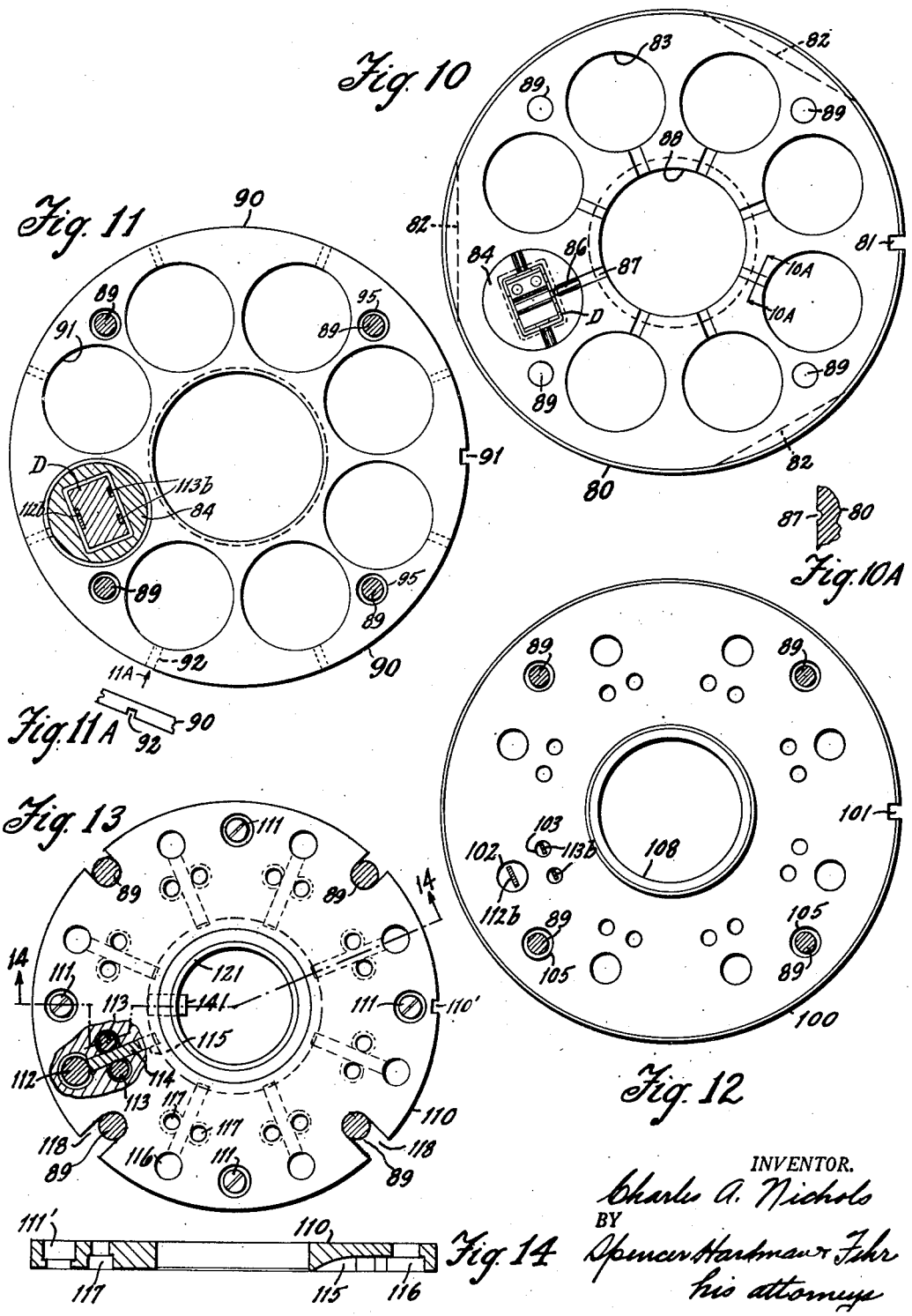
INVENTOR.
Charles A. Nichols
BY Spencer Hartman & Fehr
his attorneys

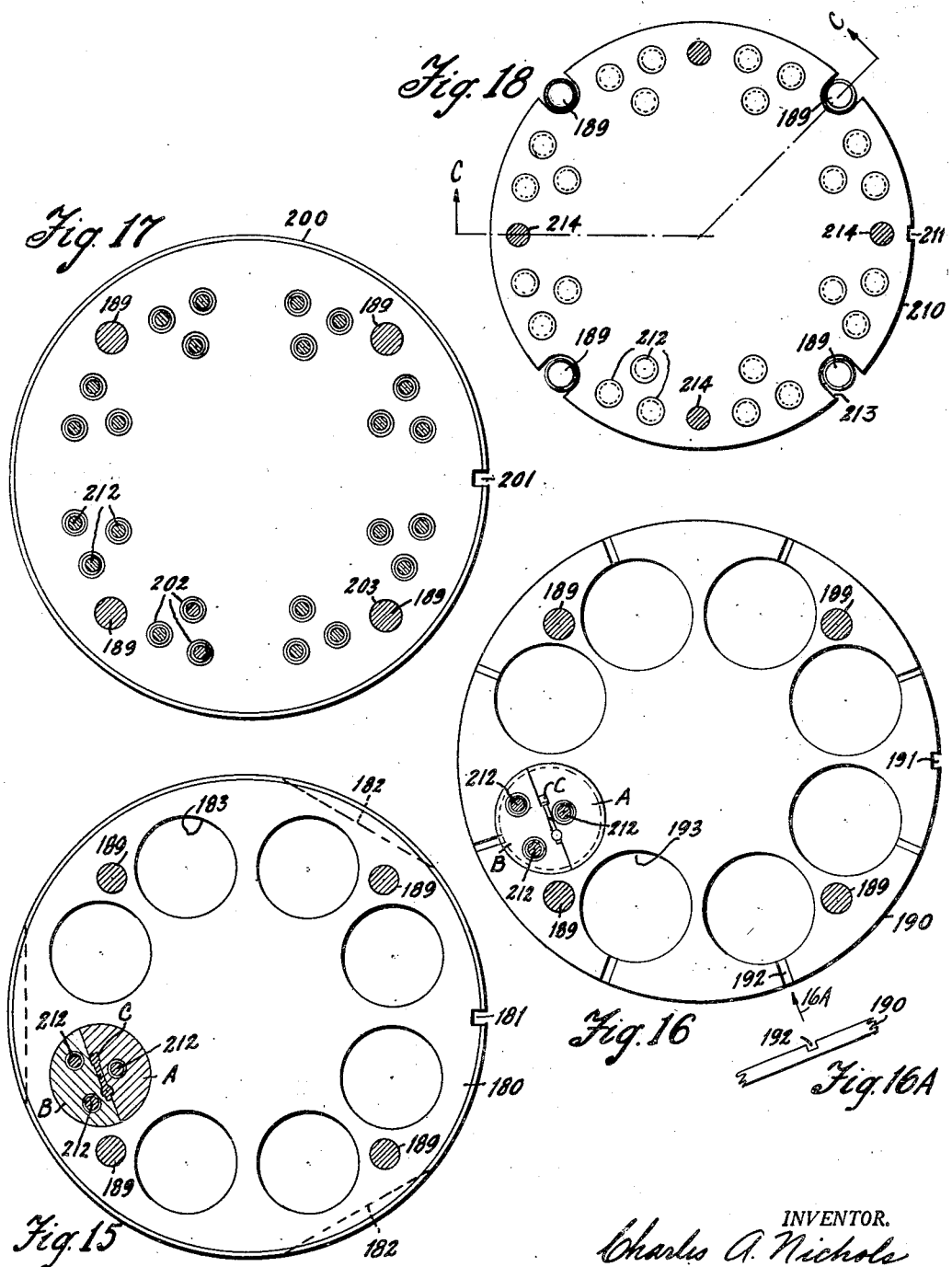

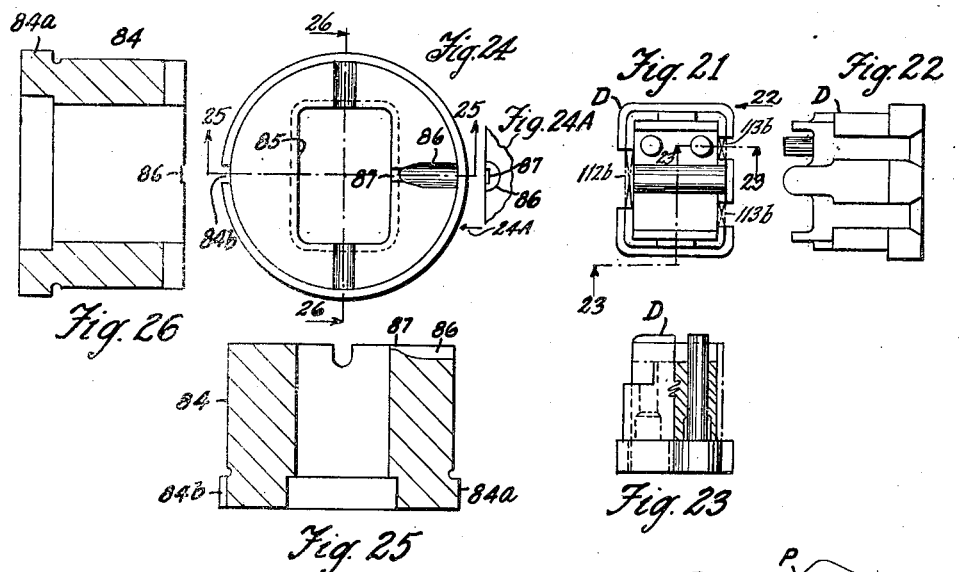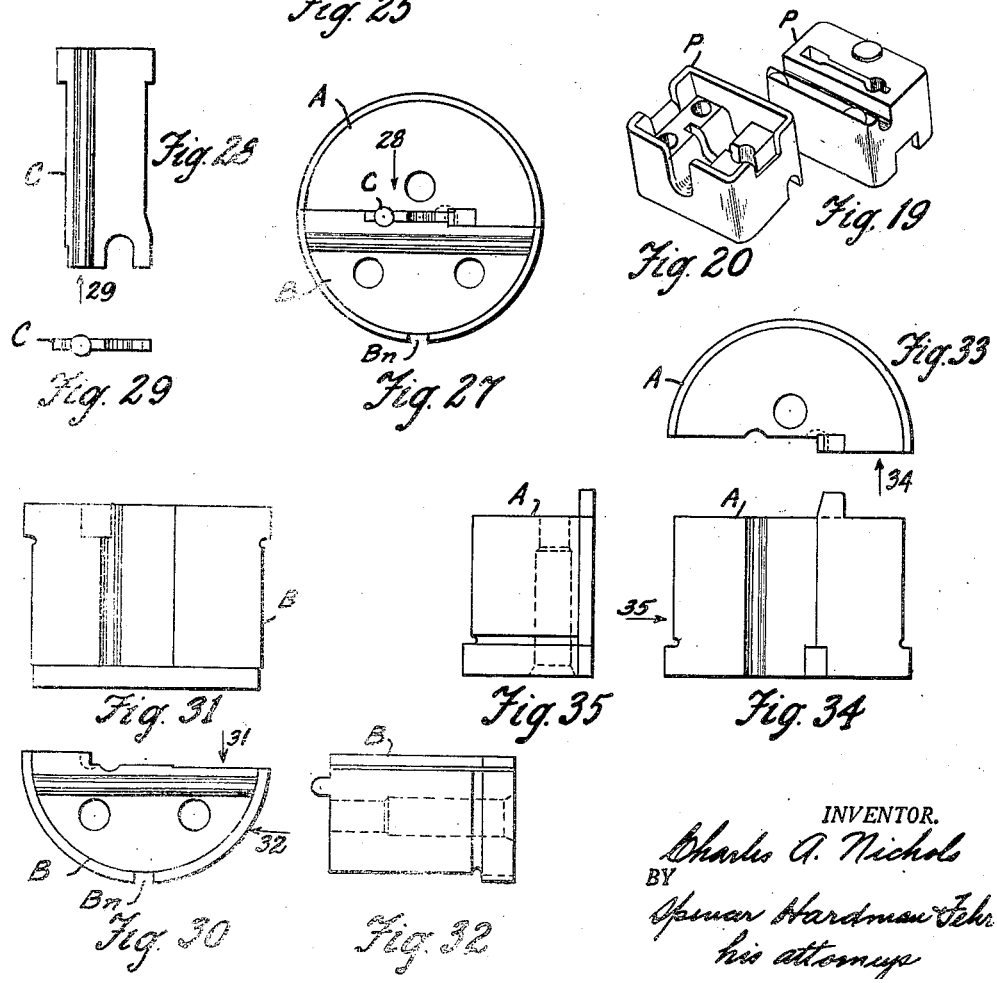

Patented May 22, 1951

2,554,378

UNITED STATES PATENT OFFICE 2,554,378

MOLD ASSEMBLY

Charles A. Nichols, Anderson, Ind., assignor to General Motors Corporation, Detroit, Mich., a corporation of Delaware Application November 29, 1947, Serial No. 788,944

6 Claims. (Cl. 18—42)

This invention relates to the art of molding articles from plastic material particularly thermosetting material.

An object of the invention is to reduce the cost of mold equipment by reducing the number of different parts required. In the disclosed embodiment of the present invention this object is accomplished by providing a mold shell adapted to receive any one of a number of die and knockout pin assemblies respectively comprising parts for supporting a plurality of dies and the knockout pins associated therewith, by providing a die assembly including a die plate capable of receiving a plurality of interchangeable dies of the same thickness and by providing a knock-out-pin assembly including a support to which there can be attached different pin-plates supporting the required knock-out pins. The shell will receive a die-assembly of a certain total thickness equal to the thickness of three components, namely, a die plate, a die locator plate and a pressure block. Die plates of different thickness can be used depending on the thickness of the dies. Pressure blocks of different thickness can be used depending on the thickness of the die plate used and the location of the knock-out pins. The same die locator can be used with these different combinations of die plates and pressure plates.

Further objects and advantages of the present invention will be apparent from the following description, reference being had to the accompanying drawings wherein a preferred embodiment of the present invention is clearly shown.

In the drawings:

Fig. 3 is a sectional view on lines A—A of Figs. 1 and 2 showing the lower and upper shells in the closest relation.

Fig. 4 is a fragmentary view in the direction of the arrow 4 of Fig. 3.

Figure 9:
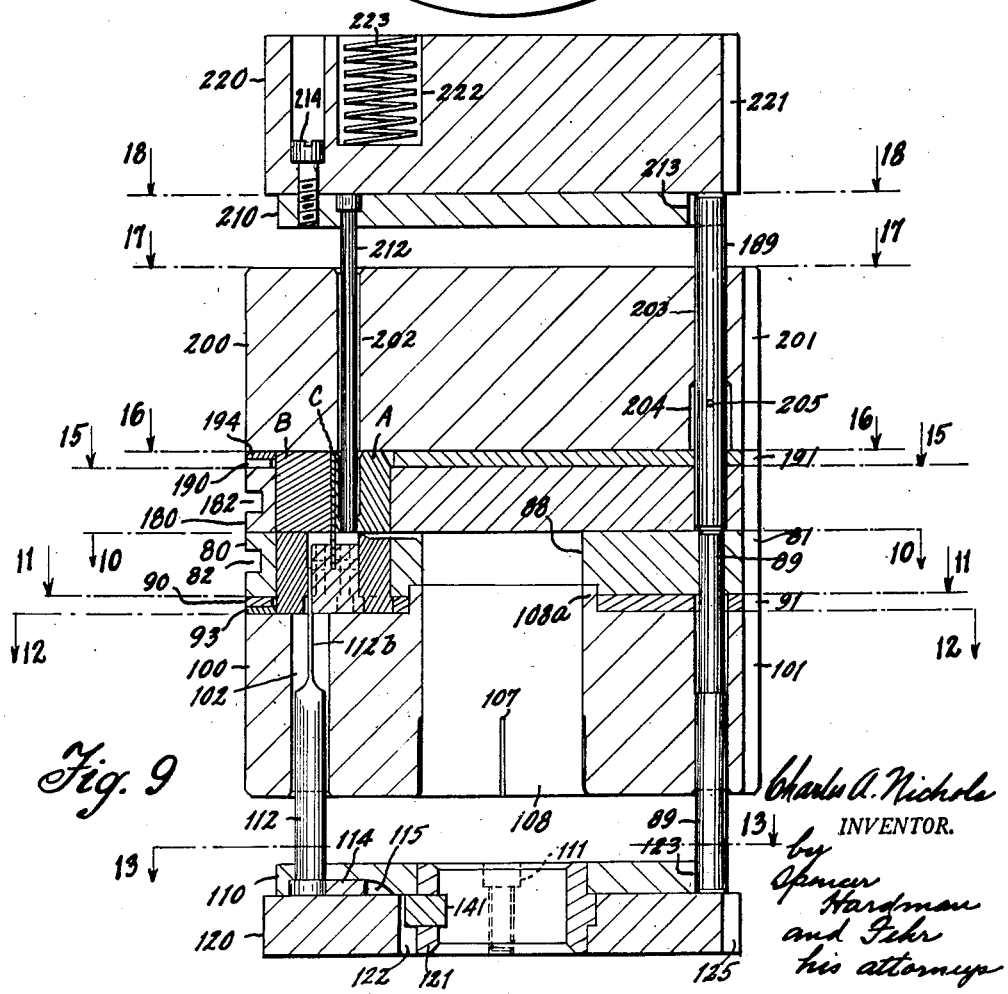
Fig. 9 is a sectional view on line C—C of Fig. 8 showing the upper and lower die assemblies in engaging relation.

Figs. 10, 11, 12 and 13 are views on lines 10—10, 11—11, 12—12 and 13—13 respectively of Fig. 9.

Fig. 10A is a sectional view on line 10A—10A of Fig. 10.

Fig. 11A is a fragmentary view in the direction of the arrow 11A of Fig. 11.

Fig. 14 is a sectional view on line 14—14 of Fig. 13.

Figs. 15, 16, 17, and 18 are views taken respectively on the lines 15—15, 16—16, 17—17, and 18—18 of Fig. 9.

Fig. 16A is a fragmentary view looking in the direction of arrow 16A of Fig. 16.

Fig. 19 is a perspective view of a part selected as an example of one kind of work for which a mold constructed in accordance with the present invention is adapted.

Fig. 20 is a perspective view of the same part inverted.

Fig. 21 is a plan view of the lower die for molding the parts shown in Figs. 19 and 20.

Fig. 22 is a view in the direction of arrow 22 of Fig. 21.

Fig. 23 is a view on line 23—23 of Fig. 21.

Fig. 24 is a plan view of the lower die carrier.

Fig. 24A is a fragmentary view in the direction of arrow 24A of Fig. 24.

Figs. 25 and 26 are sectional views taken respectively on the line 25—25 and 26—26 of Fig. 24.

Fig. 27 is a plan view of the upper die comprising parts A, B and C in assembled relation.

Fig. 28 is a view of die part C looking in the direction of arrow 28 of Fig. 27.

Fig. 29 is a view of part C looking in the direction of arrow 29 in Fig. 28.

Fig. 30 is a view of die part B separated from the other parts shown in Fig. 27.

Fig. 31 is a view in the direction of arrow 31 of Fig. 30.

Fig. 32 is a view in the direction of arrow 32 of Fig. 30.

Fig. 33 is a view of die part A separated from the other parts shown in Fig. 27.

Fig. 34 is a view in the direction of arrow 34 of Fig. 33.

Fig. 35 is a view in the direction of arrow 35 of Fig. 34.

Figure 36:
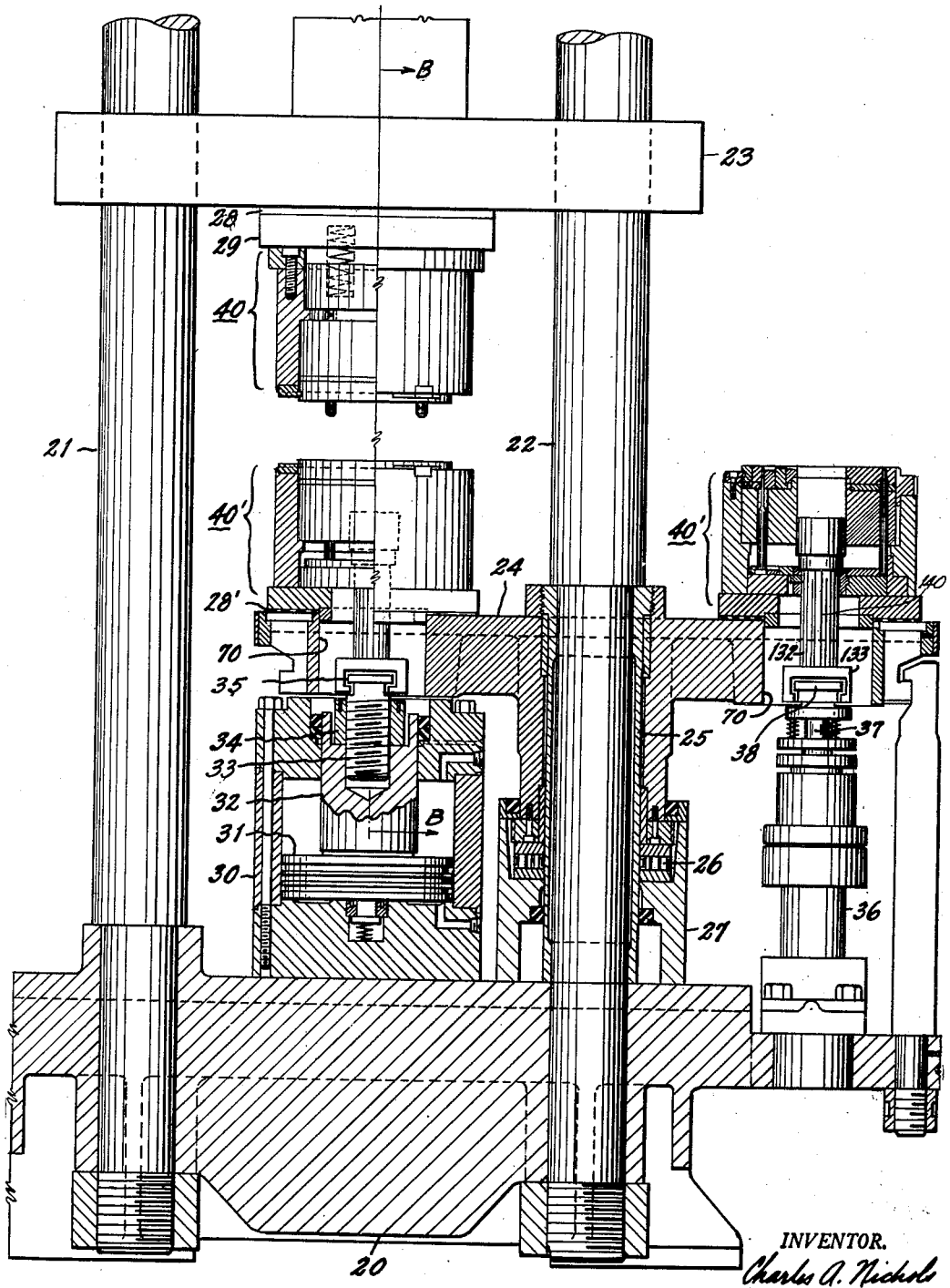

Fig. 36 is a fragmentary side view partly in section of a press for operating the molds shown in the preceding figures the parts in section being taken in the vertical plane which intersects the axes of posts 21 and 22.

Referring to Fig. 36, the press has a base 20 which supports posts 21 and 22 which guide for vertical movement a press head plate 23 which is operated by a hydraulic servomotor not shown. A table 24 is pivotally supported by the post 22, said table being secured to a bearing sleeve 25 journalled on the post. The weight of the table and parts supported thereby is taken by a step bearing 26 carried by a bracket 27. The base 20 supports a hydraulic servomotor comprising a cylinder 30 and a piston 31 whose rod 32 carries an adjustable screw 33 secured in the desired position of vertical adjustment by a nut 34. Screw 33 has a T-head 35 for a purpose to be described. Table 20 supports hydraulic servomotor including a cylinder 36 within which there is a piston connected with a rod 37 which is connected with a T-head 38 for a purpose to be described.

Figure 2:
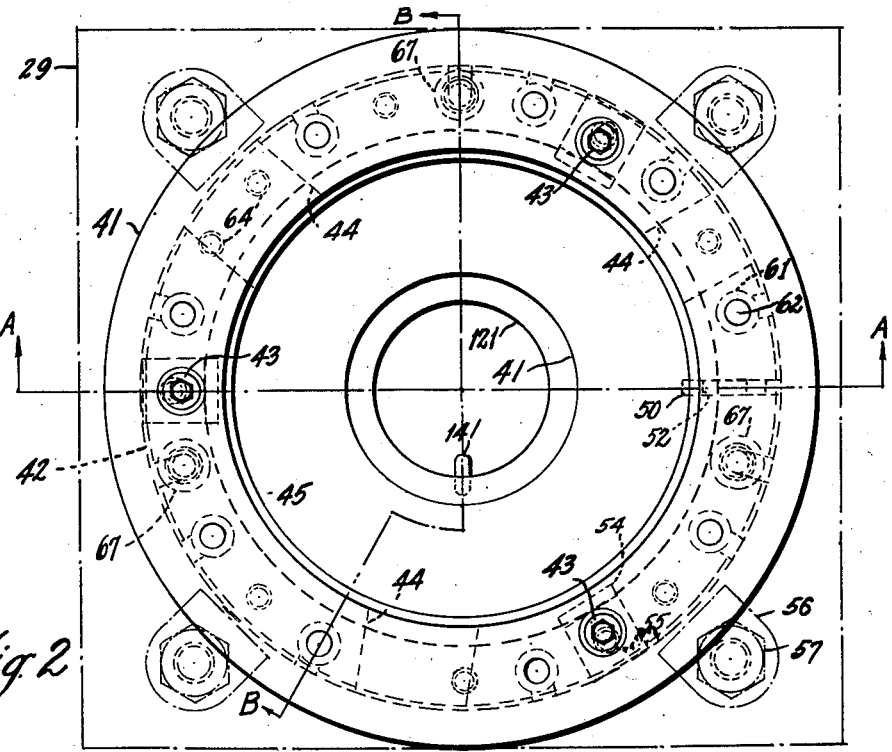
Figs. 1 and 2 are plan views respectively of lower and upper mold frames or shells adapted to be operated by a hydraulic molding press.

The press head plate 23 supports a heat insulating plate 28 and a metal plate 29. Plate 29 supports an upper mold shell assembly 40 which comprises a ring 41 and a shell 42 which screws 43 attach to the ring 41. Shell 42 is provided with three notches 44 (Figs. 2 and 3) through which compressed air can be blown for clean-out purposes. Shell 42 has an internal annular flange 45 having plane surfaces 46 and 47. Notches 48 and 49 receive a key 50 and notch 51 receives a key 52. Three notches 53 each receive a clamp 54 retained by a screw 55. The assembly 40 is secured to the plate 29 shown in dot dash lines in Fig. 2 by clamps 56 and screws 57.

Figure 5:
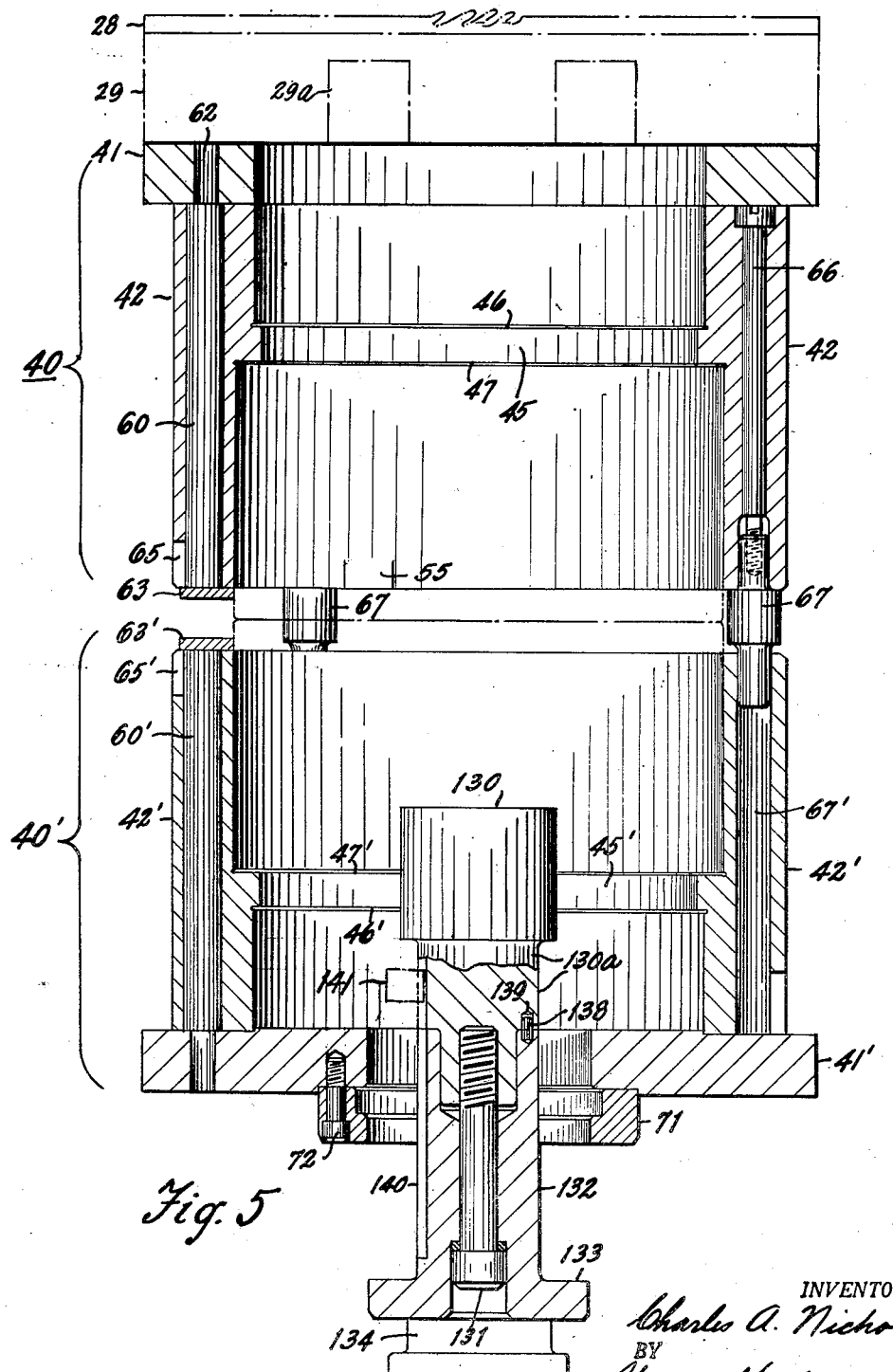
Fig. 5 is a view similar to Fig. 3, but taken on the lines B—B of Figs. 1 and 2.

The shell 42 is heated by a plurality of heating elements 60 (Fig. 5) received by holes 61 (Fig. 2) in shell 42. Holes 62 provided by a plate 41 in alignment with holes 61 may each receive a rod for driving out a heater element 60 in case it sticks in the shell 42. The elements 60 are retained by clamping segments 63 (Figs. 3 and 5) which are retained by screws (not shown) passing through threaded holes 64 (Fig. 2) in the shell 42. The wires leading to the heater element may be brought out through notches 65 (Fig. 5). Three screws 66 secure to the shell 42 three pilot pins 67 which are adapted to be received by holes 67' in the lower shell 42'.

Figure 1:
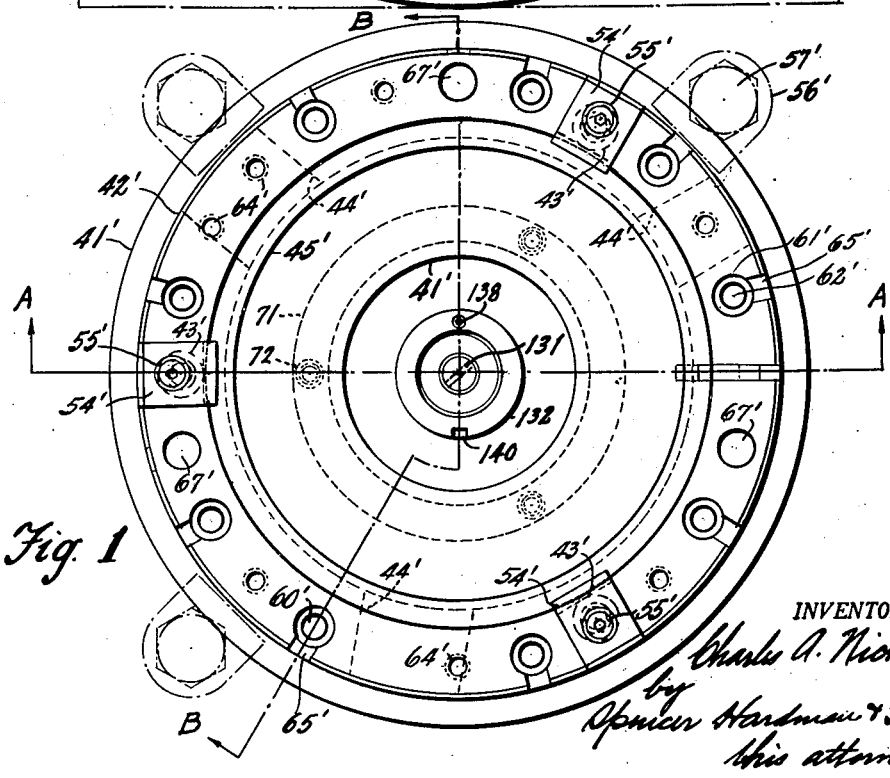

Shell 42' is a part of a lower shell assembly 40' which comprises parts similar to those of the upper shell assembly 40. The parts of the lower assembly which are similar to the upper assembly have the same reference numerals with the prime affixed. The plate 41' of the lower assembly together with a heat insulating plate 28' is secured to the table 24 by clamps 56' and screws 57' shown in dot dash lines in Fig. 1. The table 24 supports two of the assemblies 40' and, in order to locate these assemblies properly, the table is provided with two diametrically opposite holes 70 each of which receives a ring 71 which screws 72 attach to plate 41'.

Figure 7:
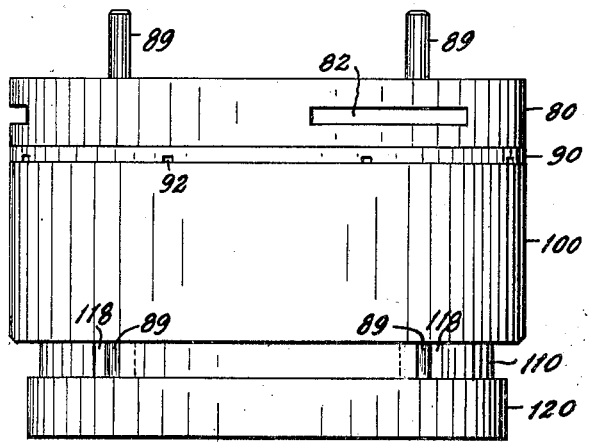

Each lower assembly is adapted to receive a lower die assembly such as shown in Fig. 7 which includes a sub-assembly of plates 80, 90 and a block 100 shown respectively in Figs. 10, 11 and 12. These parts are fitted together as shown in Fig. 9 and the block 100 rests upon the surface 47' of the flange 45' of shell 42'. These parts are located in proper alignment by key 52' received by grooves 81, 91 and 101 respectively of the parts 80, 90 and 100. The three clamps 54' which project into the grooves 82 of plate 80 hold the parts within the shell 42' when the screws 55' are attached and tightened.

The plate 80 has a plurality of holes 83 each for receiving a lower die carrier 84 (Figs. 24 to 26) having a central opening 85 for receiving the lower die D (Figs. 21–23). Each carrier 84 has a circular flange 84a received by a hole 91 in locator plate 90. To prevent turning the carrier 84 in plate 90 the latter is provided with key slots 92 each of which receives a key 93 (Fig. 9) which is received by the notch 84b in flange 84a. Each carrier 84 has a groove 86 which aligns with a groove 87 (Figs. 10 and 10A) provided by plate 80, said latter groove extending into a central bore 88 which provides a portion of an injection cylinder. Bore 88 is in alignment with a bore 108 in the block 100 (Figs. 9 and 12) said bore being surrounded by a flange 108a (Fig. 9) which fits into the plates 90 and 80. The walls of bore 108 are grooved at 107 to provide for the relief of vacuum. The cylinder provided by bores 108 and 88 receives a piston or ram 130 (Figs. 3 and 5) which a screw 131 attached to a rod 132 having a head 133 provided with a T slot 134 defined by arcuate surfaces 135, 136 and 137 (Fig. 4) whose center of curvature is the axis of rotation of the table 24. The T-slot 134 is adapted to receive either the T-head 35 of the screws 33 or the T-head 38 associated with the cylinder 36 as shown in Fig. 36. To prevent rotation of the head 133 the rod 132 and the stem of the ram 130 there is provided a key slot 140 which receives a key 141 which as shown in Fig. 9 extends through a sleeve 121 located centrally of the pin-plate supporting plate 120 said key extending also into a notch 122 of plate 120. Sleeve 121 is retained upon plate 120 by a pin-plate 110 which screws 111 secure to plate 120. Plates 110 and 120 support knock-out pins 112 and 113 (Fig. 13) the heads of which have flats so as to be engaged by a common key 114 received by a key slot 115 in plate 110. Therefore the rods 112 and 113 cannot turn. The heads of these rods are received by counterbores in the plate 110 and are retained by attaching pin-plate 110 and assembled pins 112 and 113 to the plate 120 by means of screws 111. The rods 112 and 113 extend upwardly through holes 102 and 103, respectively, in block 100 (Fig. 12). Rods 112 terminate in blades 112B and rods 113 terminate in blades 113B which as shown in Fig. 11 slide along grooves in the die D for the purpose of ejecting the work molded by said die. Only one set of pins 112, 113 is shown assembled with the plate 110 in Fig. 13. The holes for pins 112 are marked 116, and the holes for pins 113 are marked 117.

Upon the plate 120 there rests four push-back pins 89 which pass through notches 118 in plate 110 through holes 105 in block 100, through holes 95 in plate 90 and through plate 80. The ends of these pins 89 appear in Fig. 10. The knock-out pin assembly which includes plates 110 and 120 and pins 112 and 113 can be assembled within the lower part of the shell 42' below the surface 46' before the shell 42' is attached to plate 41' by the screws 43'. However before this assembly is made, the ram 130 is located upon the sleeve 121 with the key slot 140 in the stem of the ram receiving the key 141. Then the rod 132 is located with its slot 140 receiving the key 141. When these parts are thus located, a dowel pin 138 attached to rod 132 will register with a dowel pin hole 139 provided by the ram 130. Then the screw 131 is assembled and tightened to secure the ram 130 and the rod 132. Then the knock-out-pin assembly of plates 110 and 120 and pins 112 and 113 and the assembly of ram 130 and rod 132 can be assembled with the plate 41'. Thereafter the plate 41' can be assembled with the shell 42' because the ring 71 will clear the stem head 133.

Figure 6:
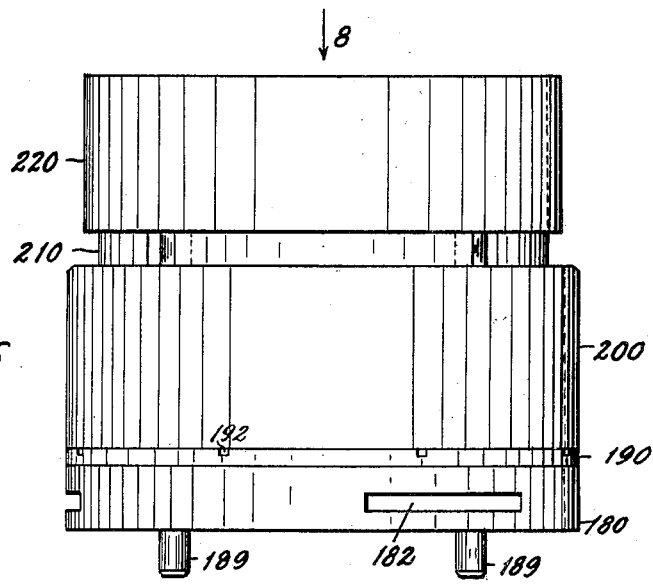
Figs. 6 and 7 are side views respectively of the upper and lower die assemblies in separated relation.

The upper die assembly (Fig. 6) comprises die assembly plates 180, 190 and block 200 and knockout-pin assembly block 200, pin-plate 210, and pins 212. Parts 180, 190 and 200 of the upper die assembly are similar to parts 80, 90 and 100 respectively of the lower die assembly. The block 200 contacts the surface 47 of flange 45. Plates 180 and 190 and block 200 are provided respectively with grooves 181, 191 and 201 which receive key 52 which locates these parts. Plate 180 is provided with grooves 182 which receive the clamps 54 which are secured by screws 55. Thus the parts 180, 190 and 200 are detachably secured within the shell 42.

The plate 180 is provided with holes 183 each for receiving assembly of upper die parts comprising the parts A, B and C shown in Figs. 27 to 35 inclusive. The dies provide openings for the knockout pins 212. The plate 180 provides holes for receiving the push-back pins 189.

Fig. 16 shows that plate 190 is provided with holes 193 for receiving the die parts A, B and C through which the knockout pins 212 extend. Plate 190 is provided with key grooves 192 each receiving keys 194 (Fig. 9) which fit into the notches Bn (Fig. 27) of the die B. Plate 190 has openings through which the push-back pins 189 extend.

Fig. 17 shows that a block 200 is provided with holes 202 for receiving the knockout pins 212 and with holes 203 for receiving the pushback pins 189. As viewed in Fig. 9, the lower portion of each hole 203 is enlarged at 204 to receive a cross pin 205 in each pin 189 which extends beyond the periphery of the pin 189 so that, when the upper die is separated from the lower die, the pins 189 will not drop out because the cross pins 205 will be caught by the plate 190.

Figure 8:
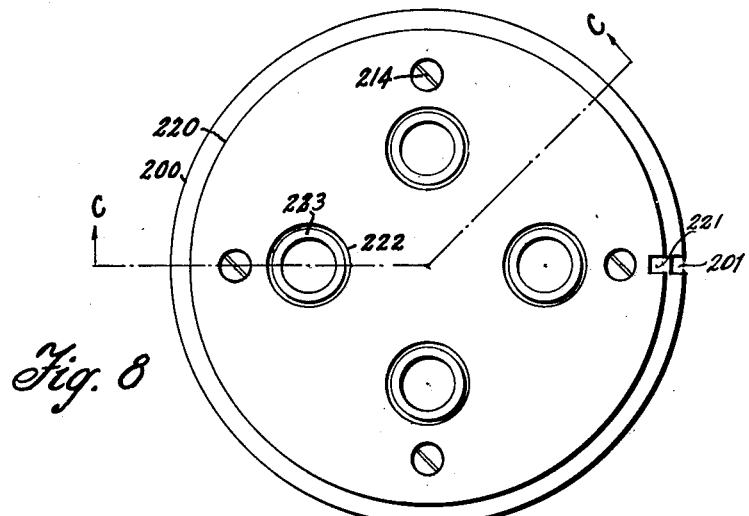
Fig. 8 is a view in the direction of arrow 8 of Fig. 6.

Fig. 18 shows pin-plate 210 which is provided with notches 213 for receiving the upper ends of the pushback pins 189 which may engage the block 220. Plate 210 is provided with counterbored holes for receiving the head ends of the knockout pins 212. These pins are retained when pin-plate 210 is secured to pin-plate supporting block 220 by screws 214 (Fig. 8). Block 220 has a groove 221 for receiving the key 50 (Fig. 3) and with holes 222 each for receiving a spring 223 also received by recesses 29a (Figs. 3 and 5) in plate 29. The function of the springs 223 is to urge the plate 210 toward the surface 46 of flange 45 of shell 42 when the upper mold rises from the lower mold whereby the knockout pins 212 strip the work from the upper die cavities. The parts are stripped from the lower die cavities at the loading station by upward movement of the piston in cylinder 36 which head 38 connects with the T slotted head 133 of the rod 132. When these parts are caused to move up the head 133 engages the plate 120 thereby causing the pins 112, 113 to move upward to eject the work from the lower die cavities. When the upper mold is lowered upon the lower mold, the push-back pins 189 of the upper mold engage the push-back pins 89 of the lower mold assembly thereby causing the ejector pins to be retracted from the mold cavities. Die plates 80 and 180 accommodate different dies of the same diameter and thickness. If dies of other thickness are used, die plates of the required thickness can be substituted, and pressure blocks of suitable thickness and knock-out-pin hole spacing can be substituted so that the total thickness of the die assembly will be the same. The dies of varying thickness can have flanges of the same thickness so that the same die-locator plates 90 and 190 can be used. The same blocks 220 and 120 can be used with various die assembly combinations, and will accommodate the required pin plates 210 and 110 carrying suitably arranged knock-out pins. The same ram 130 can be used since no change in injection cylinder diameter is required for work which can be molded by die assemblies which can be accommodated by shells of a certain diameter.

Satisfactory heat transfer for the shells to the die assemblies require close fit. Therefore the heat treatment of the parts should be such that metallurgical structure is stabilized so that dimensional relativity is not affected by temperature. For example, it is desirable that the thick pressure blocks 100 and 200 fit snugly within the shells so as to operate efficiently to transfer heat from the shells to the dies and also to function as heat storage bodies which would retard reduction of die temperature when the molds are open. It is desirable, after repeated use of the molds, that these blocks as well as other die plates be as easily removable from the shell as when first assembled. Therefore the heat treatment should be such as to prevent growth during use.

While the embodiment of the present invention as herein disclosed, constitutes a preferred form, it is to be understood that other forms might be adopted, all coming within the scope of the claims which follow.

What is claimed is as follows:

1. A mold assembly comprising a shell adapted to be mounted on the base or head of a molding press, a die assembly which is detachably secured in the shell and which provides an injection cylinder and mold cavities and runner grooves which extend from the cylinder to the mold cavities, a knock-out-pin assembly housed within the shell and including knock-out pins received by the die assembly, a ram located in the cylinder and guided for movement by the knock-out pin assembly, a member for moving the ram and engageable with the knock-out-pin assembly in order to move it when molded parts are to be ejected, and push back pins extending through the die assembly and operatively connected with the knock-out-pin assembly.

2. A mold assembly comprising a cylindrical shell and a supporting plate attached thereto, said shell providing an internal annular flange, a cylindrical die assembly comprising a die plate, a die-locator plate and a die pressure block, said assembly fitting within the shell with the die plate outermost and the block innermost and contacting the flange, means detachably connected with the shell and engaging the die plate to retain the die assembly within the shell, means engaging the shell and die assembly members to maintain them in proper alignment said die plate having circular holes, cylindrical dies received by said holes, means engaging the locator plate and the dies to locate them circumferentially, and a knock-out pin assembly comprising knock-out pins extending through the pressure block and into the dies, a pin-plate connected with the pins, a pin-plate support to which the pin-plate is attached, said pin-plate support being received within the shell on the side of the flange remote from the pressure plate, means engaging the pin-plate support and the shell to prevent rotative displacement while permitting the support to move axially of the shell, and push-back pins engageable with the pin-plate support and extending through the die assembly.

3. A mold assembly comprising a cylindrical shell and a supporting plate attached thereto, said shell providing an internal annular flange, a cylindrical die assembly comprising a die plate, a die-locator plate and a die pressure block, said assembly fitting within the shell with the die plate outermost and the block innermost and contacting the flange, means detachably connected with the shell and engaging the die plate to retain the die assembly within the shell, means engaging the shell and die assembly members to maintain them in proper alignment said die plate having circular holes, cylindrical dies received by said holes, circular holes in the locator plate receiving annular flanges provided by the dies, keep engaging notches in said flange and grooves in the locator plate to locate the dies circumferentially, and a knock-out-pin assembly housed within the shell and including knock-out pins received by the die assembly, and push back pins extending through the die assembly and operatively connected with the knock-out-pin assembly.

4. A mold assembly comprising a shell adapted to be mounted on the base or head of a molding press, a die assembly detachably secured therein, and providing an injection cylinder connected by runner grooves with the mold cavities, a knock-out-pin assembly comprising knock-out pins extending into the dies, a pin-plate connected with the pins, a pin-plate support to which the pin-plate is attached, means engaging the pin-plate support and the shell to prevent rotative displacement while permitting the support to move axially of the shell, a sleeve supported by said support in alignment with the cylinder and retained upon the support by the pin-plate, a rod guided by the sleeve and providing a ram located in the cylinder, a member provided by the rod for receiving an applied force and engageable with the pin-plate support to effect ejection of molded parts, and push back pins extending through the die assembly and operatively connected with the knock-out-pin assembly.

5. A mold assembly comprising a shell adapted to be mounted on the base or head of a molding press, a die assembly detachably secured therein, and providing an injection cylinder connected by runner grooves with the mold cavities, a knock-out-pin assembly comprising knock-out pins extending into the dies, a pin-plate connected with the pins, a pin-plate support to which the pin-plate is attached, means engaging the pin-plate support and the shell to prevent rotative displacement while permitting the support to move axially of the shell, a sleeve supported by said support in alignment with the cylinder and retained upon the support by the pin-plate, a rod guided by the sleeve and providing a ram located in the cylinder, a member provided by the rod and engageable with the support and having a T-slot for receiving either of two T-head members, one of which is actuated to move the ram for injection purposes, the other of which is actuated to move the support for ejection purposes, a longitudinal groove in the rod, a key supported by the sleeve and received by the groove, and push back pins extending through the die assembly and operatively connected with the knock-out-pin assembly.

6. Cooperating mold assemblies adapted respectively to be attached to the bed and movable head of a molding press, said assemblies each comprising a shell, a die assembly removably secured in each shell, a knock-out pin assembly housed for movement in each shell, the die assembly of one of the mold assemblies providing an injection cylinder and runners leading therefrom to the die cavities, a ram in said cylinder, a rod connected with the ram and guided by the associated knock-out-pin assembly, a force receiving member provided by the rod and engageable with the knock-out-pin assembly to effect ejection of molded parts, the die assembly of the other mold assembly providing a closure for the cylinder when the die assemblies are engaged, said other mold assembly having spring means to actuate its knock-out-pin assembly, and push back pins provided by both die assemblies and operatively connected with the knock-out-pin assemblies.

CHARLES A. NICHOLS.

REFERENCES CITED

The following references are of record in the file of this patent:

UNITED STATES PATENTS

| Number | Name | Date |
|---|---|---|
| 1,909,253 | Claus | May 16, 1933 |
| 1,961,941 | Pack | June 5, 1934 |
| 2,419,089 | Quarnstrom | Apr. 15, 1947 |